US012532123B2

(12) United States Patent
Yin et al.

(10) Patent No.: US 12,532,123 B2
(45) Date of Patent: Jan. 20, 2026

(54) SPEAKER

(71) Applicant: AAC Microtech (Changzhou) Co., Ltd., Jiangsu (CN)

(72) Inventors: Zhaoyu Yin, Changzhou (CN); Zhizhu Chen, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 154 days.

(21) Appl. No.: 18/523,808

(22) Filed: Nov. 29, 2023

(65) Prior Publication Data

US 2024/0340592 A1 Oct. 10, 2024

Related U.S. Application Data

(63) Continuation of application No. PCT/CN2023/087198, filed on Apr. 10, 2023.

(51) Int. Cl.

*H04R 9/02* (2006.01)
*H04R 1/28* (2006.01)
*H04R 7/12* (2006.01)
*H04R 7/16* (2006.01)
*H04R 9/04* (2006.01)

(52) U.S. Cl.

CPC ........... *H04R 9/025* (2013.01); *H04R 1/2811* (2013.01); *H04R 7/127* (2013.01); *H04R 7/16* (2013.01); *H04R 9/041* (2013.01)

(58) Field of Classification Search

CPC ...... H04R 9/025; H04R 1/2811; H04R 7/127; H04R 9/041

See application file for complete search history.

(56) References Cited

FOREIGN PATENT DOCUMENTS

CN 216775013 U * 6/2022

* cited by examiner

*Primary Examiner* — Sunita Joshi

(74) *Attorney, Agent, or Firm* — Wiersch Law Group

(57) ABSTRACT

The present invention provides a speaker including a first frame, a second frame, a first vibration system, a second vibration system, and a magnetic circuit system. The first vibration system includes a first diaphragm and a first voice coil. The second vibration system includes a second diaphragm and a second voice coil. The magnetic circuit system includes a first main magnet, first auxiliary magnets, a second main magnet and second auxiliary magnets. A projection of the first voice coil along a vibration direction of the speaker is located out of the second voice coil, and the projection of the second voice coil along the vibration direction of the speaker is located on the first main magnet. In present invention, the BL of the second voice coil is increased, the sensitivity of the speaker is improved, and the loudness becomes larger.

7 Claims, 3 Drawing Sheets

SPEAKER

FIELD OF THE PRESENT INVENTION

The present invention relates to the field of electro-acoustic conversion, and more particularly, to a back-to-back speaker.

DESCRIPTION OF RELATED ART

Speaker, also known as horn, is used in speaker boxes to convert audio signals into sound. As customers' requirements for consumer electronics products increasing, the speakers are given more requirements.

Back-to-back speaker refers to the speaker has two groups of vibration systems, and the two groups of vibration systems are set back to back. In related art, the back-to-back speaker includes two diaphragms and two voice coil, and the two voice coil are set up and down. A projection of the larger voice coil is located out of the smaller voice coil. The two voice coils are driven by one magnetic circuit system. In this back-to-back speaker, the space at the bottom of the voice coil is larger than the space required by the amplitude of the voice coil, and the space at the bottom of the voice coil is seriously wasted.

Therefore, it is desired to provide a new speaker which can overcome the above problems.

SUMMARY

In view of the above, the embodiment of the present invention provides a new speaker. By the present invention, the BL of the second voice coil of the speaker is increased, the sensitivity of the speaker is improved, and the loudness of the speaker becomes larger.

The present invention provides a speaker including a first frame, a second frame relatively fixed with the first frame and cooperatively forming a receiving room with the first frame, a first vibration system supported on a side of the first frame distal to the second frame, a second vibration system supported on a side of the second frame distal to the first frame, and a magnetic circuit system located in the receiving room to drive the first vibration system and the second vibration system. The first vibration system includes a first diaphragm and a first voice coil connected with the first diaphragm and driving the first diaphragm to vibrate and generate sounds. The second vibration system includes a second diaphragm and a second voice coil connected with the second diaphragm and driving the second diaphragm to vibrate and generate sounds. The magnetic circuit system includes a first main magnet proximal to the first vibration system, a plurality of first auxiliary magnets located outside the first main magnet and forming a first magnetic gap with the first main magnet, a second main magnet proximal to the second vibration system, and a plurality of second auxiliary magnets located outside the second main magnet and forming a second magnetic gap with the second main magnet. A projection of the first voice coil along a vibration direction of the speaker is located out of the second voice coil, and the projection of the second voice coil along the vibration direction of the speaker is located on the first main magnet.

As an improvement, the second magnetic gap is formed by been surrounded by the second main magnet, the second auxiliary magnets and the first main magnet.

As an improvement, the first main magnet is stacked on the second main magnet, and each first auxiliary magnet is stacked on the corresponding second auxiliary magnet, and the first magnetic gap is communicated with the second magnetic gap.

As an improvement, the magnetic circuit system includes a magnetic bowl, the magnetic bowl including a top wall fixed to the first main magnet, a side wall bending and extending from each side of the top wall and passing through the first magnetic gap and the second magnet, and a bottom wall bending and extending from the side wall and located below the second auxiliary magnet.

As an improvement, the magnetic circuit system further includes a first auxiliary pole plate stacked on the first auxiliary magnet, and the first auxiliary pole plate partially embedded and fixed in the first frame.

As an improvement, the magnetic circuit system further includes a main pole plate disposed on a side of the second main magnet close to the second diaphragm.

As an improvement, the bottom wall of the magnetic bowl is partially embedded and fixed in the second frame.

As an improvement, the magnetic circuit system further includes a second auxiliary pole plate disposed on the side of the second auxiliary magnet close to the second diaphragm, and the second auxiliary pole plate partially embedded and fixed in the second frame.

As an improvement, the first vibration system further includes a first elastic supporting member located between the first frame and the first voice coil, the first elastic supporting member including a first fixation portion mounted with the first frame, a second fixation portion mounted with the first voice coil, and a first connection portion connecting the first fixation portion and the second fixation portion, the second vibration system further including a second elastic supporting member located between the second frame and the second diaphragm, the second elastic supporting member including a third fixation portion mounted with the second frame, a forth fixation portion mounted with the second diaphragm, and a second connection portion connecting the third fixation portion and the forth fixation portion, the second voice coil secured with the second diaphragm through the forth fixation portion.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
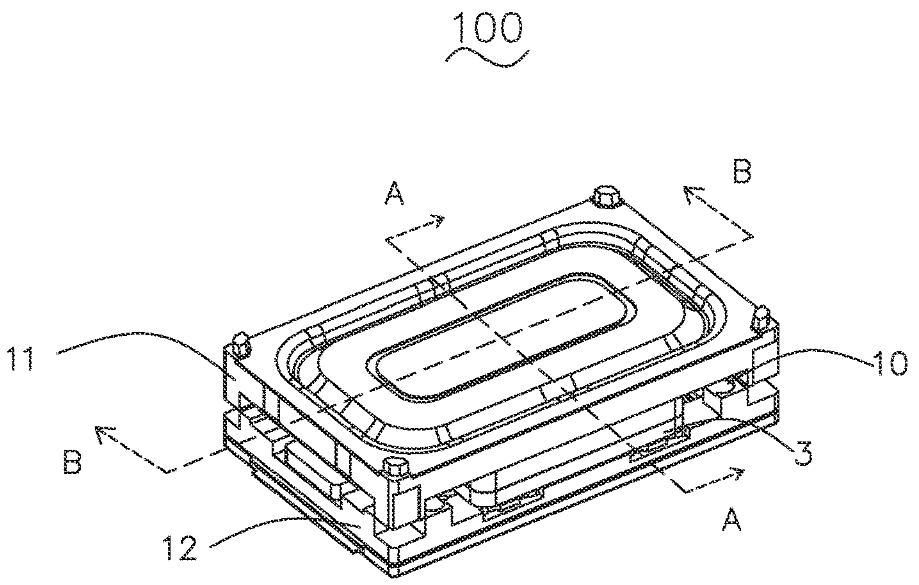
FIG. 1 is an illustrative isometric view of a speaker in accordance with one embodiment of the present invention.
Figure 2:
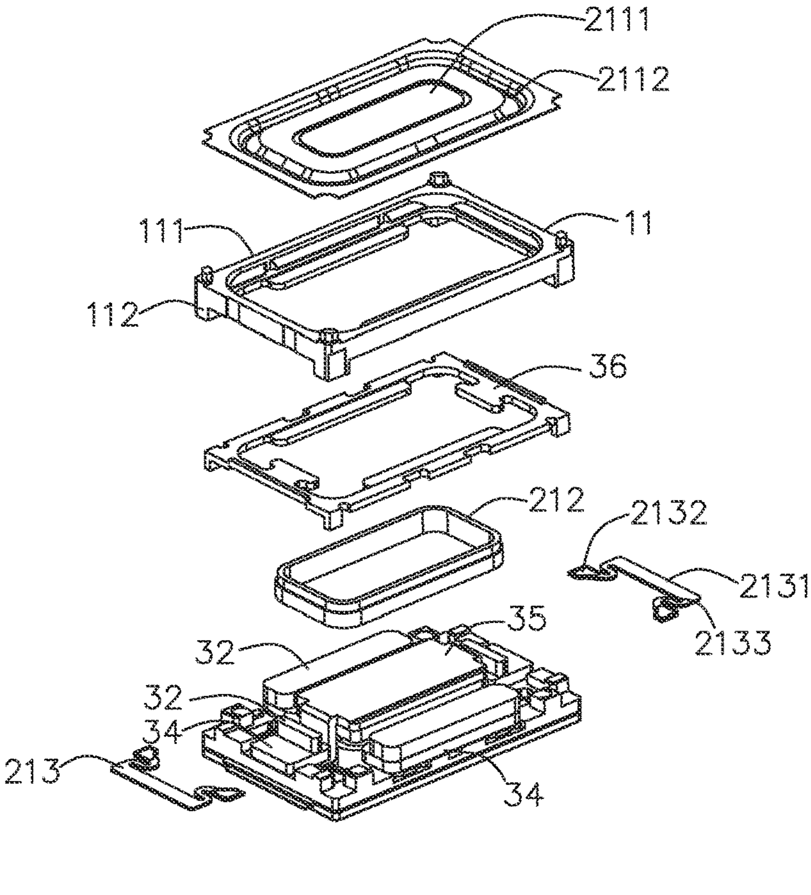
FIG. 2 is a partially exploded view of the speaker of FIG. 1.
Figure 3:
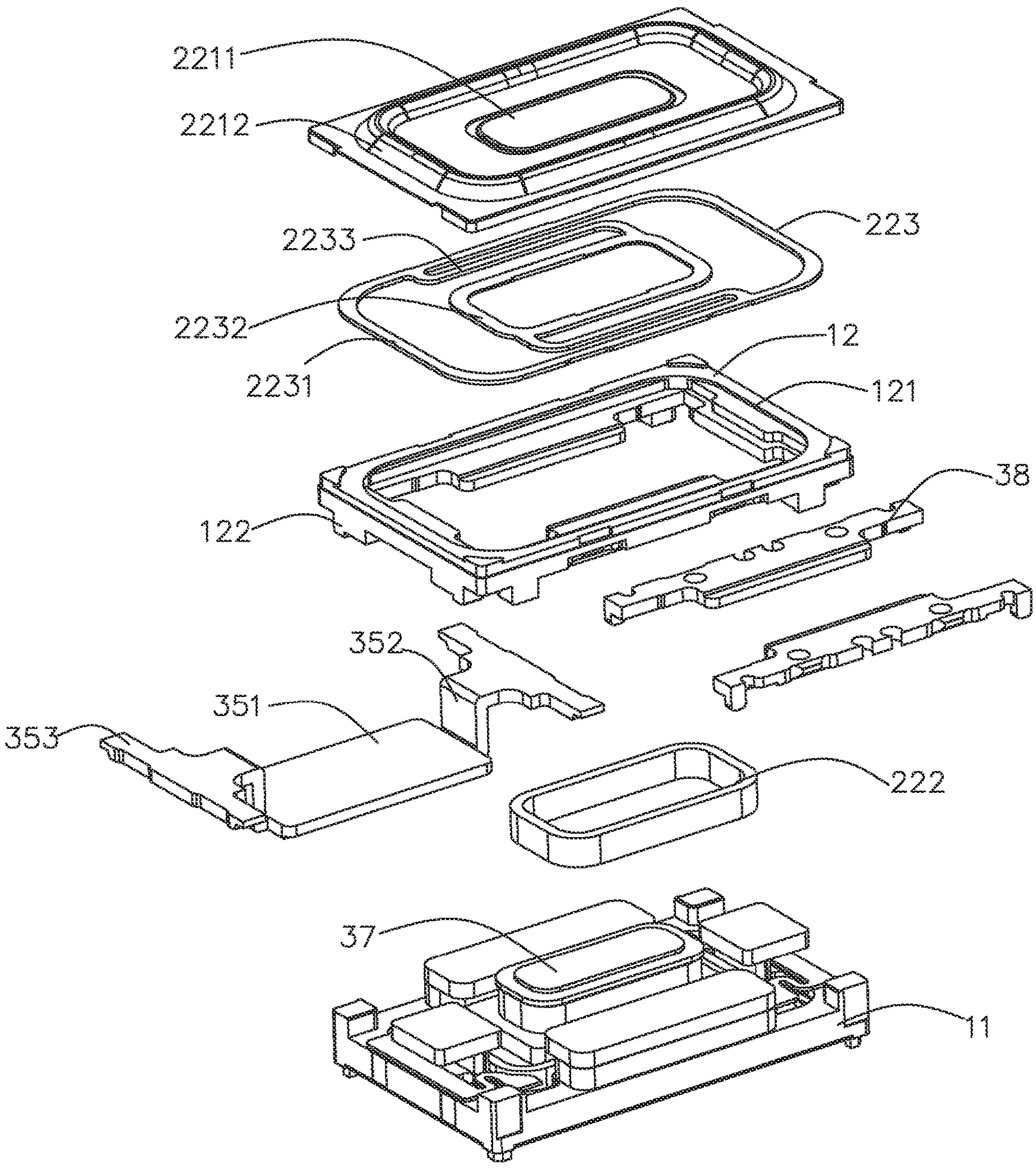
FIG. 3 is another partially exploded view of the speaker of FIG. 1.
Figure 4:
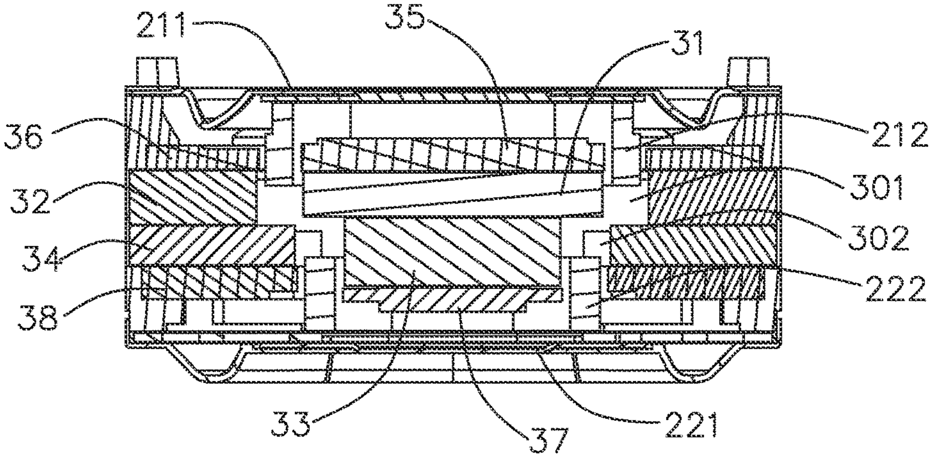
FIG. 4 is an illustrative cross-sectional view of the speaker taken along line A-A of FIG. 1.
Figure 5:
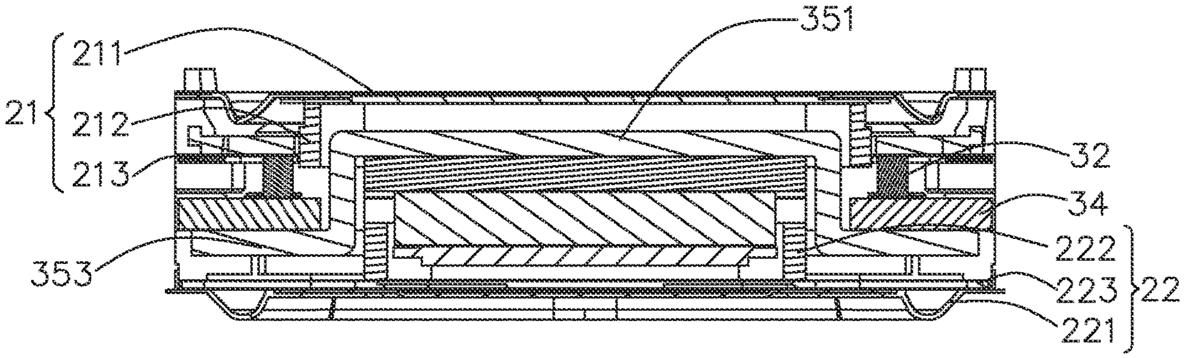
FIG. 5 is an illustrative cross-sectional view of the speaker taken along line B-B of FIG. 1.

Referring to the FIGS. 1-5, the present invention provides one embodiment of a speaker 100. The speaker 100 includes a first frame 11, a second frame 12 relatively fixed with the first frame 11 and cooperatively forming a receiving room 10 with the first frame 11, a first vibration system 21 supported on a side of the first frame 11 distal to the second frame 12, a second vibration system 22 supported on a side of the second frame 12 distal to the first frame 11, and a magnetic circuit system 3 located in the receiving room 10 for driving the first vibration system 21 and the second vibration system 22. The magnetic circuit system 3 drives the first vibration system 21 and the second vibration system 22 to vibrate and sound. The speaker 100 has a rectangular shape.

The first frame 11 is a rectangular annular hollow structure. The first frame 11 includes a first main portion 111 with an annular shape and a first supporting portion 112 extending from the first main portion 111. The number of the first supporting portions 112 is multiple and the adjacent first supporting portions 112 are arranged spaced apart from each other.

The structure of the second frame 12 has a substantially same structure with the structure of the first frame 11. The second frame 12 is also a rectangular annular hollow structure. The second frame 12 includes a second main portion 121 with an annular shape and a second supporting portion 122 extending from the second main portion 121. The number of the second supporting portions 122 is multiple and the adjacent second supporting portions 122 are arranged spaced apart from each other.

The first vibration system 21 includes a first diaphragm 211, a first voice coil 212 connected with the first diaphragm 211 and driving the first diaphragm 211 to vibrate and generate sounds, and a first elastic supporting member 213 located between the first frame 11 and the first voice coil 212. The sound direction of the first diaphragm 211 is upward along the vibration direction, that is, the sounding direction of the first diaphragm 211 is in front of the speaker 100. The first diaphragm 211 includes a first dome 2111 and a first suspension 2112 with a ring shape. The first suspension 2112 is arranged surrounding the first dome 2111. The first voice coil 212 is attached to and fixed under the first dome 2111. The first elastic supporting member 213 includes a first fixation portion 2131 mounted with the first frame 11, a second fixation portion 2132 elastically supporting the first voice coil 212, and a first connection portion 2133 connecting the first fixation portion 2131 and the second fixation portion 2132. The number of the first elastic supporting members 213 is two, and the two first elastic supporting members 213 are symmetrically arranged in a short axis direction of the speaker 100.

The second vibration system 22 has a substantially same structure with the first vibration system 21. The second vibration system 22 includes a second diaphragm 221, a second voice coil 222 connected with the second diaphragm 221 and driving the second diaphragm 221 to vibrate and generate sounds, and a second elastic supporting member 223 located between the second frame 12 and the second diaphragm 221. The sound direction of the second diaphragm 221 is downward along the vibration direction, that is, the sounding direction of the second diaphragm 221 is in back of the speaker 100. The second diaphragm 221 includes a second dome 2211 and a second suspension 2212 with a ring shape. The second suspension 2212 is arranged surrounding the second dome 2211. The second elastic supporting member 223 includes a third fixation portion 2231 mounted with the second frame 12, a forth fixation portion 2232 mounted with the second diaphragm 221, and a second connection portion 2233 connecting the third fixation portion 2231 and the forth fixation portion 2232. The third fixation portion 2231 has an annular shape and is sandwiched between the second frame 12 and the second suspension 2212. The forth fixation portion 2232 also has an annular shape and is sandwiched between the second dome 2211 and the second voice coil 222. The second voice coil 222 is secured with the second diaphragm 221 through the forth fixation portion 2232.

A size of the first voice coil 212 is larger than the size of the second voice coil 222. A projection of the first voice coil 212 along a vibration direction of the speaker 100 is located out of the second voice coil 222.

The magnetic circuit system 3 includes a first main magnet 31 proximal to the first vibration system 21, a plurality of first auxiliary magnets 32 located outside the first main magnet 31 and forming a first magnetic gap 301 with the first main magnet 31, a second main magnet 33 proximal to the second vibration system 22, and a plurality of second auxiliary magnets 34 located outside the second main magnet 33 and forming a second magnetic gap 302 with the second main magnet 33, a magnetic bowl 35, a first auxiliary pole plate 36 stacked on the first auxiliary magnet 32, a main pole plate 37 disposed on a side of the second main magnet 33 close to the second diaphragm 221, and a second auxiliary pole plate 38 disposed on the side of the second auxiliary magnet 34 close to the second diaphragm 221.

The first magnetic gap 301 is communicated with the second magnetic gap 302. The first main magnet 31 is stacked on the second main magnet 33, and each first auxiliary magnet 32 is stacked on the corresponding second auxiliary magnet 34. The number of the first auxiliary magnets 32 is four, and the number of the second auxiliary magnets 34 is also four. The first auxiliary pole plate 36 has an annular shape. The first auxiliary pole plate 36 is partially embedded and fixed in the first frame 11. The number of the second auxiliary pole plate 38 is two, and the two second auxiliary pole plate 38 are arranged on the second auxiliary magnets 34 in a long axis direction of the speaker 100. Each second auxiliary pole plate 38 is partially embedded and fixed in the second frame 12.

The second auxiliary magnet 34 extends to a bottom of the first voice coil 212, so that the first magnetic gap 301 is formed by been surrounded by the first main magnet 31, the first auxiliary magnets 32, and the second auxiliary magnets 34. The projection of the first voice coil 212 on the magnetic circuit system 3 along the vibration direction of the speaker 100 is located on the second auxiliary magnet 34. So that the magnetic permeability of the bottom of the first voice coil 212 is enhanced, and the BL (magnetic force) of the first voice coil 212 is improved, thereby the sensitivity of the speaker 100 is improved.

Similarly, the first main magnet 31 extends to a bottom of the second voice coil 222, so that the second magnetic gap 302 is formed by been surrounded by the second main magnet 33, the second auxiliary magnets 34, and the first main magnet 31. The projection of the second voice coil 222 along the vibration direction of the speaker 100 is located on the first main magnet 31. So that the magnetic permeability of the bottom of the second voice coil 222 is enhanced, and the BL (magnetic force) of the second voice coil 222 is improved, thereby the sensitivity of the speaker 100 is improved.

The magnetic bowl 35 includes a top wall 351 fixed to the first main magnet 31, a side wall 352 bending and extending from each side of the top wall 351 and passing through the first magnetic gap 301 and the second magnet 302, and a bottom wall 353 bending and extending from the side wall 352 and located below the second auxiliary magnet 34. The bottom wall 353 of the magnetic bowl 35 is partially embedded and fixed in the second frame 12. The two second auxiliary pole plate 38 are arranged on the second auxiliary magnets 34 in the long axis direction of the speaker 100, where the bottom wall 353 of the magnetic bowl 35 is equivalent to the auxiliary pole plate arranged on the second auxiliary magnets 34 in the short axis direction of the speaker 100. And the top wall 351 of the magnetic bowl 35 is equivalent to the main pole plate arranged on the first main magnet 31.

Compared with related technologies, the present invention provides a speaker including a first frame, a second frame relatively fixed with the first frame and cooperatively forming a receiving room with the first frame, a first vibration system supported on a side of the first frame distal to the second frame, a second vibration system supported on a side of the second frame distal to the first frame, and a magnetic circuit system located in the receiving room to drive the first vibration system and the second vibration system. The first vibration system includes a first diaphragm and a first voice coil connected with the first diaphragm and driving the first diaphragm to vibrate and generate sounds. The second vibration system includes a second diaphragm and a second voice coil connected with the second diaphragm and driving the second diaphragm to vibrate and generate sounds. The magnetic circuit system includes a first main magnet proximal to the first vibration system, a plurality of first auxiliary magnets located outside the first main magnet and forming a first magnetic gap with the first main magnet, a second main magnet proximal to the second vibration system, and a plurality of second auxiliary magnets located outside the second main magnet and forming a second magnetic gap with the second main magnet. A projection of the first voice coil along a vibration direction of the speaker is located out of the second voice coil, and the projection of the second voice coil along the vibration direction of the speaker is located on the first main magnet.

In present invention, the speaker separates the magnetic circuit system to drive two vibration systems, fully utilizing the space below the second voice coil, which improves the BL (magnetic force) of the second voice coil, improves the sensitivity of the speaker, and increases the loudness.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker, comprising:

a first frame;

a second frame relatively fixed with the first frame and cooperatively forming a receiving room with the first frame;

a first vibration system supported on a side of the first frame distal to the second frame, the first vibration system comprising a first diaphragm and a first voice coil connected with the first diaphragm and driving the first diaphragm to vibrate and generate sounds;

a second vibration system supported on a side of the second frame distal to the first frame, the second vibration system comprising a second diaphragm and a second voice coil connected with the second diaphragm and driving the second diaphragm to vibrate and generate sounds; and a magnetic circuit system located in the receiving room to drive the first vibration system and the second vibration system, the magnetic circuit system comprising:

a first main magnet proximal to the first vibration system;

a plurality of first auxiliary magnets located outside the first main magnet and forming a first magnetic gap with the first main magnet;

a second main magnet proximal to the second vibration system; and a plurality of second auxiliary magnets located outside the second main magnet and forming a second magnetic gap with the second main magnet;

wherein a projection of the first voice coil along a vibration direction of the speaker is located out of the second voice coil, and the projection of the second voice coil along the vibration direction of the speaker is located on the first main magnet;

wherein the second magnetic gap is formed by been surrounded by the second main magnet, the second auxiliary magnets and the first main magnet, the first main magnet is stacked on the second main magnet, and each first auxiliary magnet is stacked on the corresponding second auxiliary magnet, and the first magnetic gap is communicated with the second magnetic gap.

2. The speaker as described in claim 1, wherein the magnetic circuit system includes a magnetic bowl, the magnetic bowl comprising a top wall fixed to the first main magnet, a side wall bending and extending from each side of the top wall and passing through the first magnetic gap and the second magnet, and a bottom wall bending and extending from the side wall and located below the second auxiliary magnet.

3. The speaker as described in claim 2, wherein the magnetic circuit system further comprises a first auxiliary pole plate stacked on the first auxiliary magnet, and the first auxiliary pole plate partially embedded and fixed in the first frame.

4. The speaker as described in claim 3, wherein the magnetic circuit system further comprises a main pole plate disposed on a side of the second main magnet close to the second diaphragm.

5. The speaker as described in claim 2, wherein the bottom wall of the magnetic bowl is partially embedded and fixed in the second frame.

6. The speaker as described in claim 4, wherein the magnetic circuit system further comprises a second auxiliary pole plate disposed on the side of the second auxiliary magnet close to the second diaphragm, and the second auxiliary pole plate partially embedded and fixed in the second frame.

7. The speaker as described in claim 1, wherein the first vibration system further comprises a first elastic supporting member located between the first frame and the first voice coil, the first elastic supporting member comprising a first fixation portion mounted with the first frame, a second fixation portion mounted with the first voice coil, and a first connection portion connecting the first fixation portion and the second fixation portion, the second vibration system further comprising a second elastic supporting member located between the second frame and the second diaphragm, the second elastic supporting member comprising a third fixation portion mounted with the second frame, a forth fixation portion mounted with the second diaphragm, and a second connection portion connecting the third fixation portion and the forth fixation portion, the second voice coil secured with the second diaphragm through the forth fixation portion.

* * * * *